(12) United States Patent
Kroeger

(10) Patent No.: US 6,652,262 B2
(45) Date of Patent: Nov. 25, 2003

(54) INJECTION MOLD APPARATUS WITH IMPROVED TAKE-OFF PLATE

(75) Inventor: Charles R. Kroeger, Loveland, OH (US)

(73) Assignee: Caco Pacific Corporation, Covina, CA (US)

( * ) Notice: Subject to any disclaimer, the term of this patent is extended or adjusted under 35 U.S.C. 154(b) by 193 days.

(21) Appl. No.: 09/912,643

(22) Filed: Jul. 24, 2001

(65) Prior Publication Data

US 2003/0021862 A1 Jan. 30, 2003

(51) Int. Cl.$^7$ ............................................... B29C 45/42
(52) U.S. Cl. .................. 425/556; 414/226.02; 425/534
(58) Field of Search .................... 414/225.01, 226.01, 414/226.02; 425/436, 438, 444, 526, 534, 528, 539, 556; B29C 49/64, 45/42

(56) References Cited

U.S. PATENT DOCUMENTS

| 3,846,531 A | * 11/1974 | Reilly | 264/161 |
|---|---|---|---|
| 4,124,352 A | * 11/1978 | Pasch | 425/556 |
| 5,443,360 A | 8/1995 | Lamb et al. | 414/799 |
| 5,447,426 A | 9/1995 | Gessner et al. | 425/436 R |
| 5,470,221 A | * 11/1995 | Gaiser | 425/556 |
| 5,855,932 A | * 1/1999 | Bright et al. | 425/444 |
| 6,168,740 B1 | * 1/2001 | Koch et al. | 264/237 |
| 6,299,431 B1 | * 10/2001 | Neter | 425/526 |
| 6,391,244 B1 | * 5/2002 | Chen | 264/336 |
| 6,428,304 B1 | * 8/2002 | Sartor et al. | 425/526 |
| 2002/0090415 A1 | * 7/2002 | Herbst | 425/556 |

FOREIGN PATENT DOCUMENTS

| CA | 2233065 | * 3/1998 |
|---|---|---|
| EP | 0686081 B1 | * 3/1999 |
| EP | 1075923 A1 | * 2/2000 |
| EP | WO 00/29193 | * 5/2000 |

\* cited by examiner

*Primary Examiner*—W. L. Walker
(74) *Attorney, Agent, or Firm*—Sheldon & Mak; Denton L. Anderson

(57) ABSTRACT

An injection mold apparatus for the injection molding of plastic articles. The mold apparatus has a plurality of take-off plates. Each of the take-off plates comprises a plurality of article acceptors. The take-off plates are movable between positions wherein the article acceptors can accept molded articles from the mold and positions wherein the molded articles are moved away from the mold. In a preferred embodiment, each of the article acceptors consists of opposed half-cylinders which can be separated to accept and discharge the molded articles. Also in preferred embodiments, each of the article acceptors is internally cooled so as to be able to cool each article acceptor after it has been moved away from the mold.

18 Claims, 13 Drawing Sheets

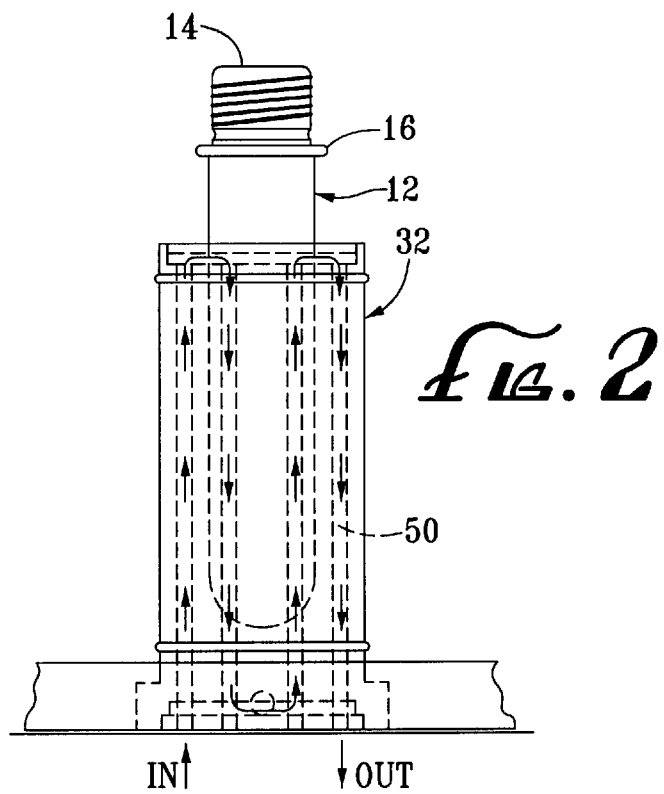
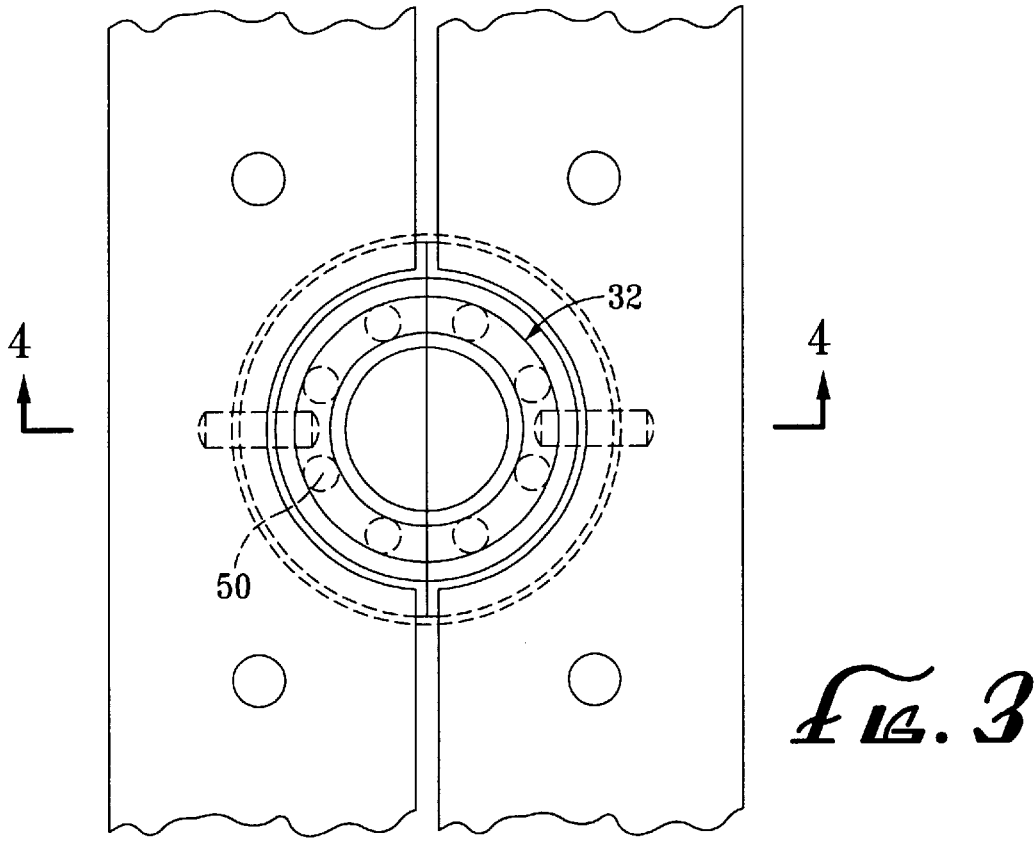

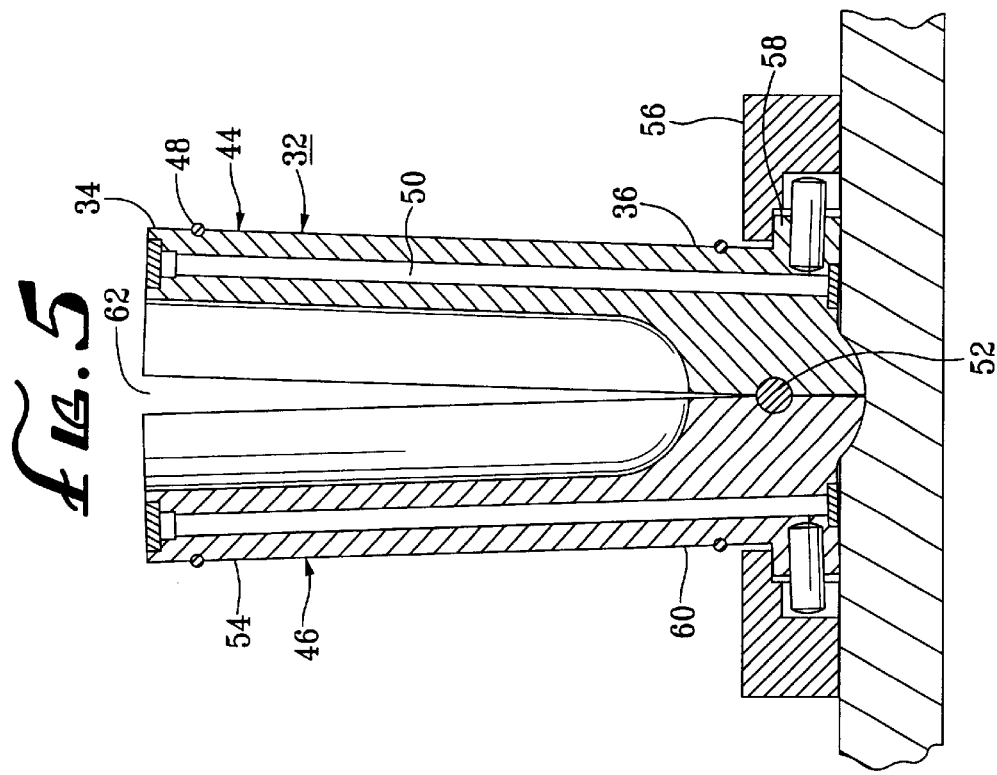
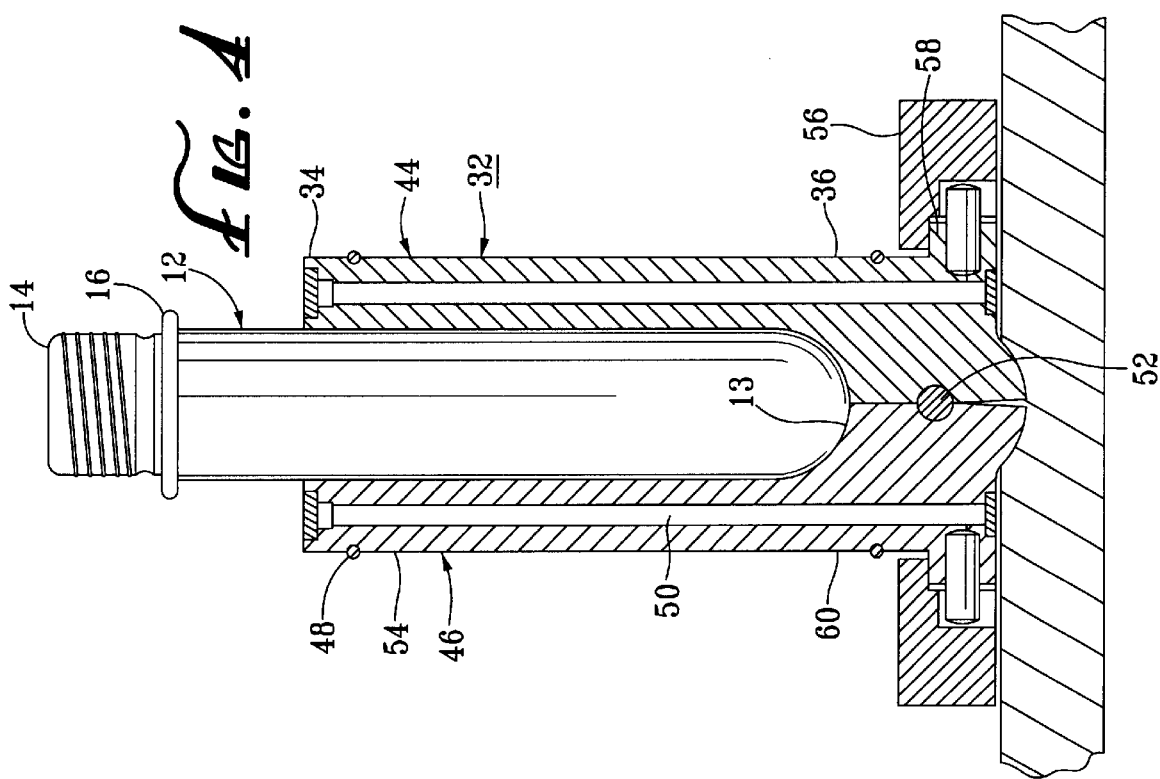

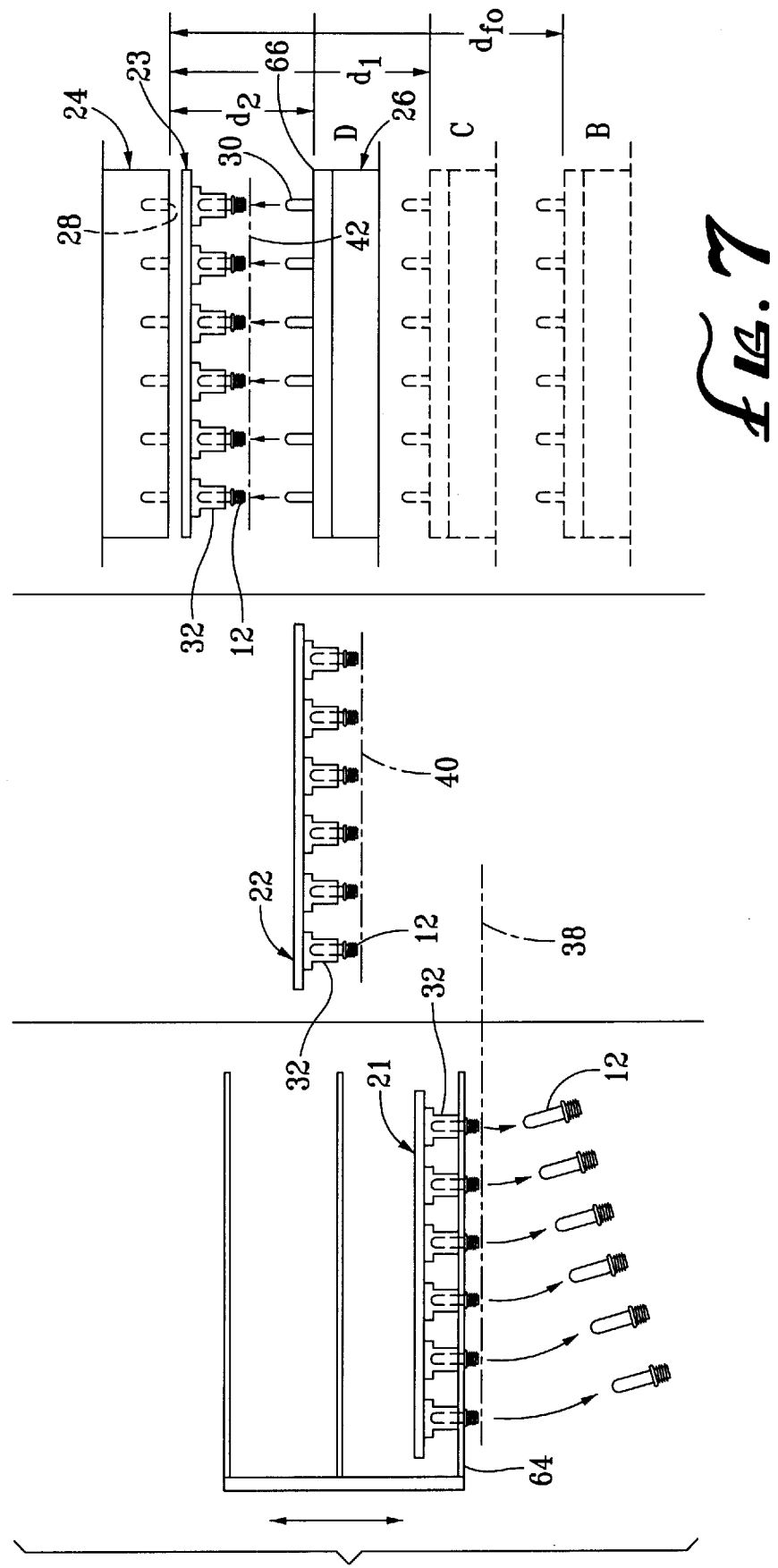

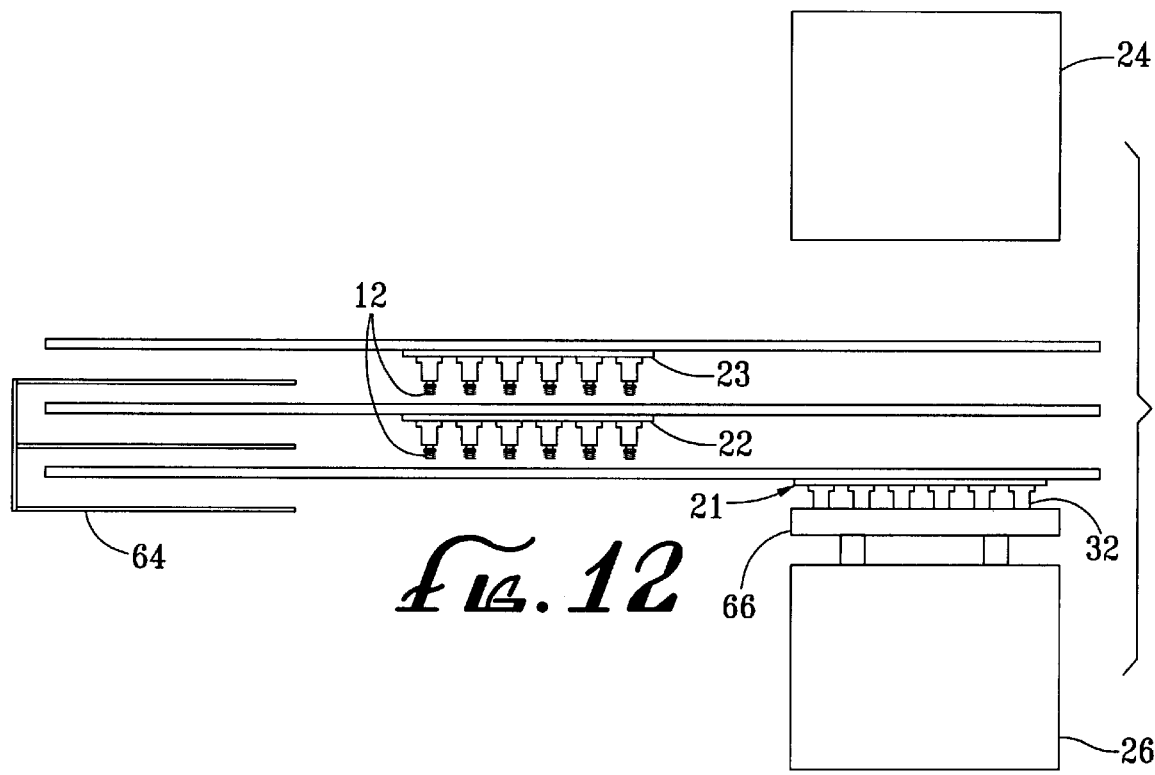
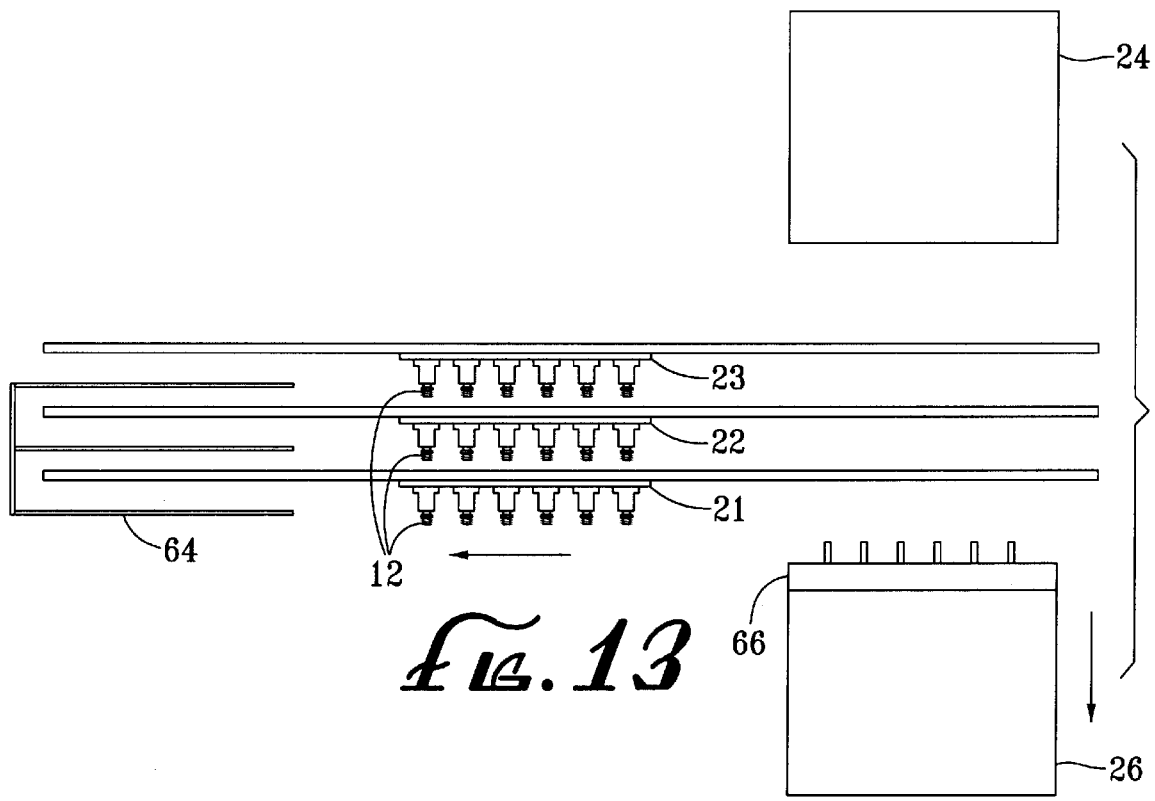

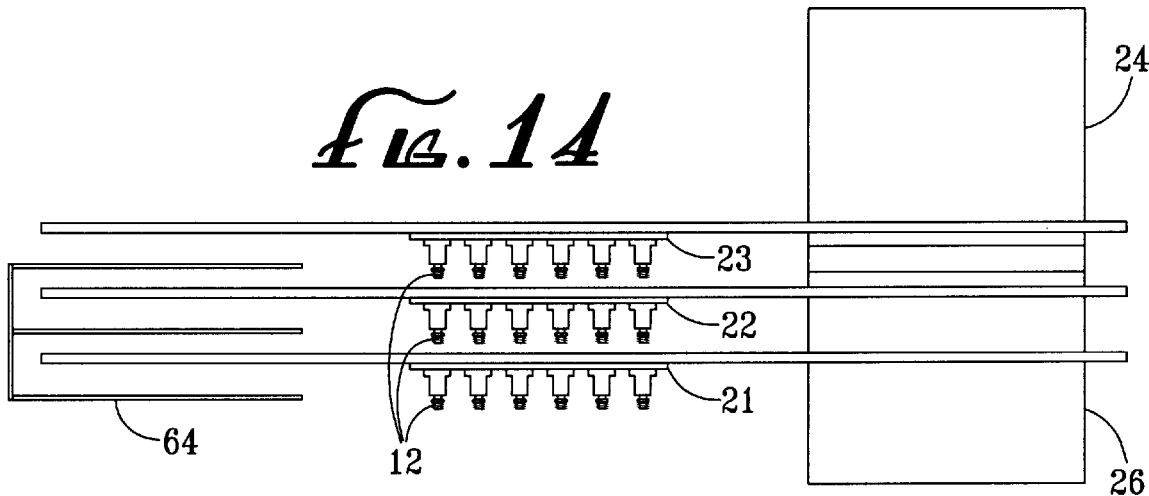
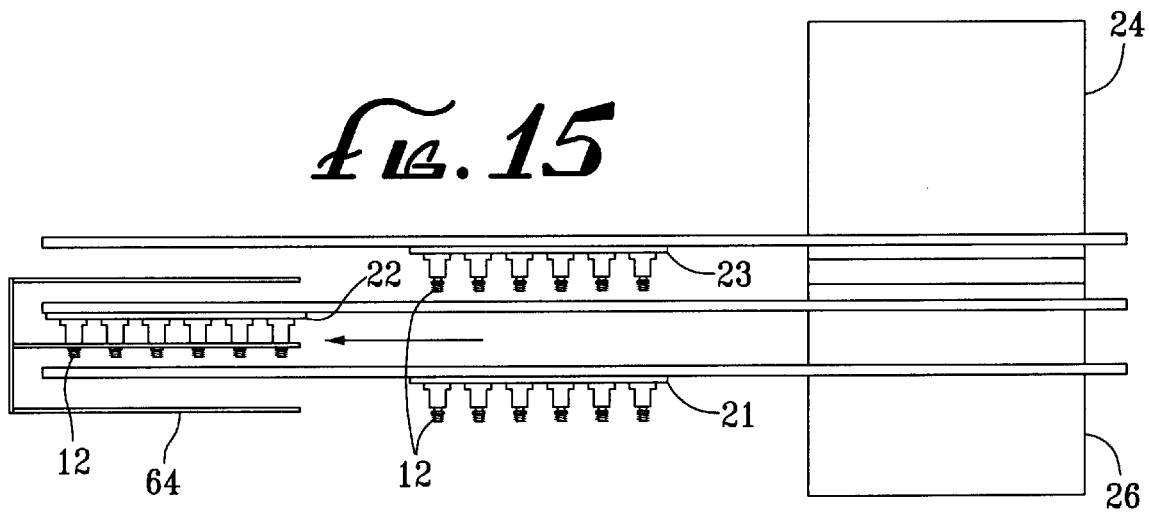

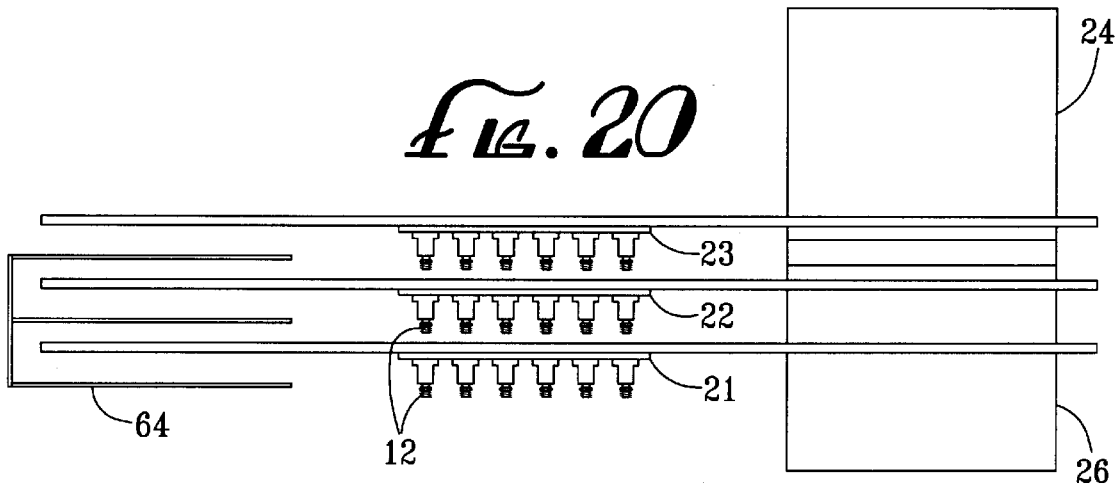
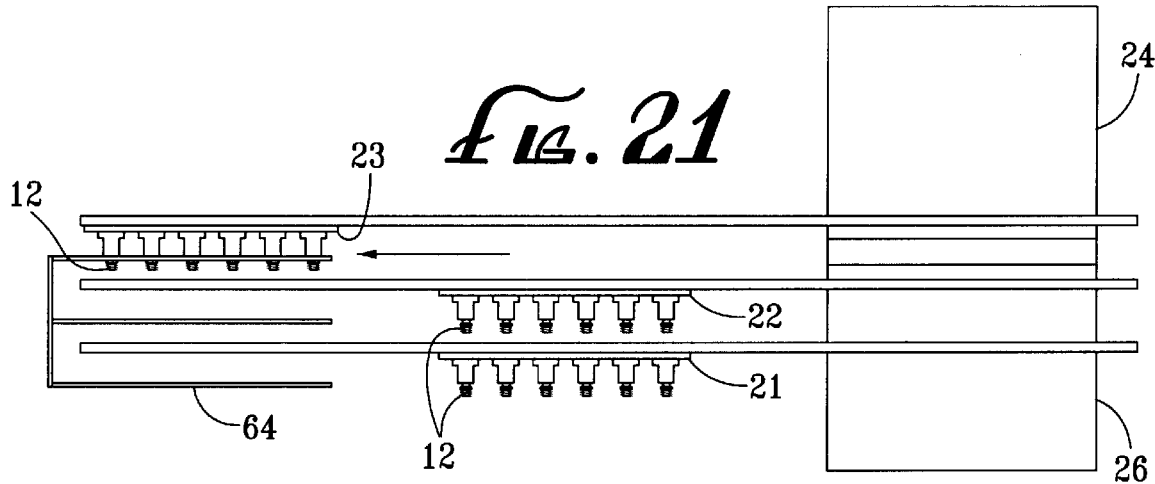

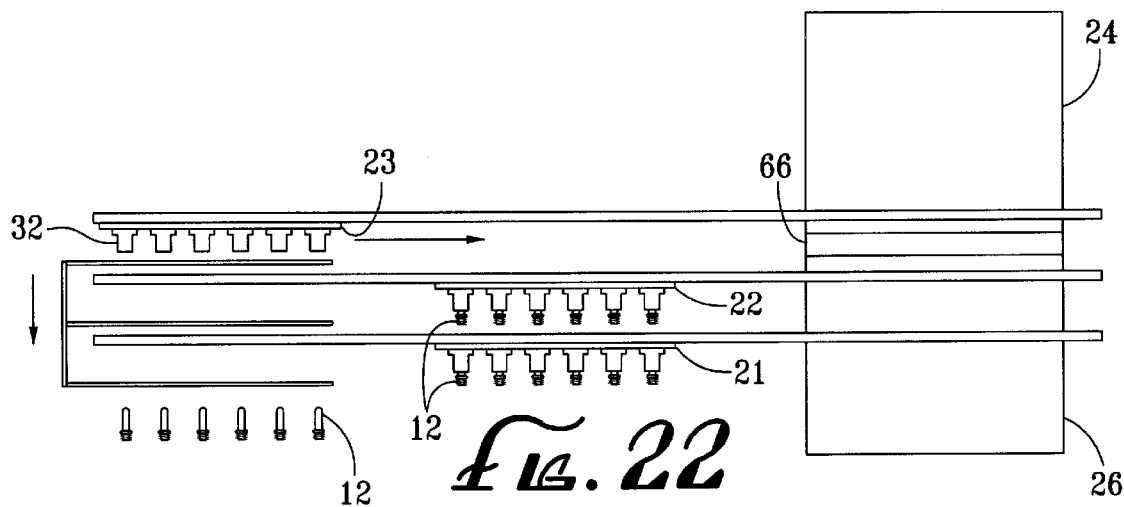
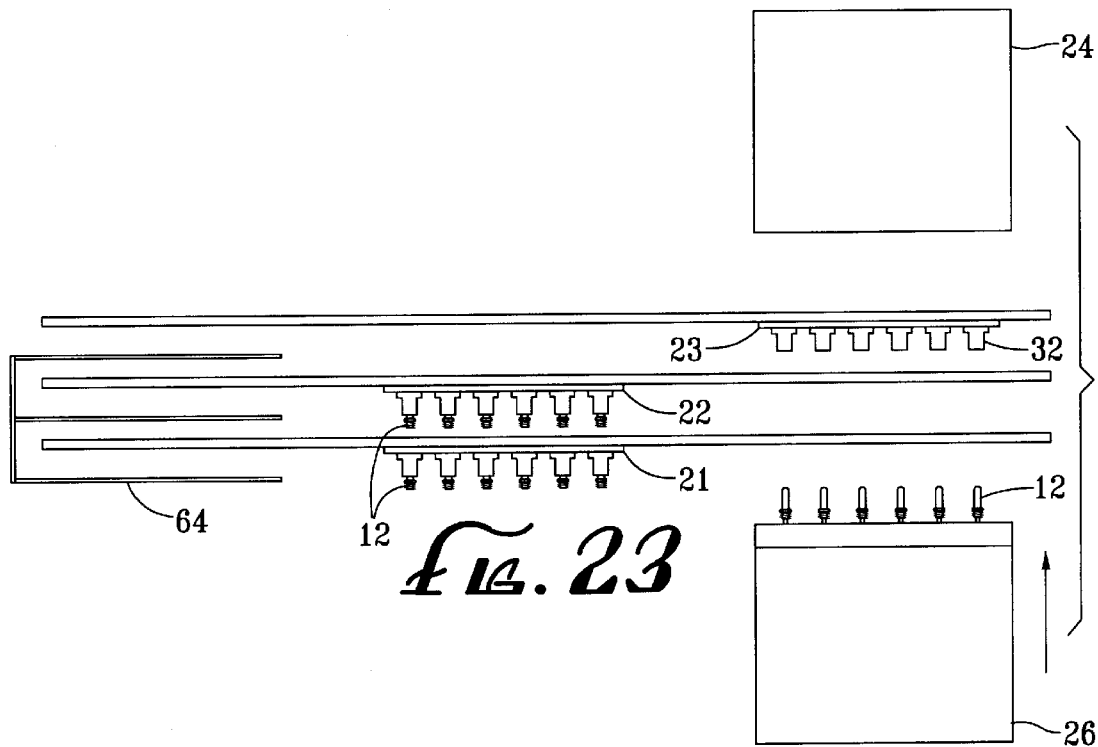

INJECTION MOLD APPARATUS WITH IMPROVED TAKE-OFF PLATE

FIELD OF THE INVENTION

This invention relates generally to injection mold apparatuses and, more specifically, to injection mold apparatuses having automated article removal equipment.

BACKGROUND OF THE INVENTION

The manufacture of small plastic articles is often most efficiently accomplished by use of an injection mold apparatus capable of concurrently molding a large number of the plastic articles.

Virtually all such injection mold apparatuses comprise some form of article removal equipment capable of automatically removing the finished plastic articles from the mold.

In the manufacture of certain plastic articles, it is highly advantageous to cool the finished plastic article upon their removal from the mold. U.S. Pat. No. 5,447,426, discloses an injection mold apparatus having equipment which automatically removes the finished plastic articles from the mold and incorporates a cooling system for rapidly cooling those finished plastic parts. The cooling of the plastic articles in the removal equipment is advantageous to the user because the cooling of the plastic articles is thereby rapidly and efficiently accomplished.

Unfortunately, the device taught in the '426 patent is not wholly satisfactory. The device employs a take-off plate having a plurality of article acceptors to accept the plastic articles from the mold apparatus and to transfer them away from the mold apparatus. Each of these article acceptors is rearwardly tapered. A vacuum is used at the rear portion of each acceptor to draw the finished plastic article into the acceptor. This method of drawing the finished articles into the acceptors limits the applicability of the method to only a certain range of taper angles within the acceptors. Moreover, cooling within the acceptors tends to be non-uniform since the sidewalls of each article are in contact with the cooled interior sidewall surface of each acceptor before the end portion of each article is fully drawn into contact with the cooled interior bottom wall surface of the acceptor. Still further, the use of vacuum equipment in the take-off plates requires that the take-off plates be cumbersome, heavy and difficult to rapidly move. It also necessitates that each take-off plate carry complex article ejection equipment to eject the articles from the acceptors after the articles are cooled.

Accordingly, there is a need for an ejection mold apparatus having the capability to automatically remove and cool finished molded articles which avoids the aforementioned problems in the prior art.

SUMMARY

The invention satisfies this need. The invention is an apparatus useful in the manufacture of molded articles. The apparatus comprises a mold for making the molded articles, a take off plate (termed herein a "first carrying device") for transferring molded articles from the mold and a second similar take off plate ("second carrying device") for transferring the articles from the mold.

The mold has a first portion and an opposed second portion. The first portion comprises an array of N mold cavities. The second portion comprises an array of N mandrels. Each of the mandrels are aligned with one of the mold cavities. The first portion and the second portion of the mold are movable with respect to one another between (i) a closed position wherein the first portion and the second portion are in abutment with one another and the mold cavities are each enclosed, (ii) a fully open position wherein the first portion and the second portion are spaced apart from one another by a distance $d_{fo}$ and (iii) a first intermediate open position wherein the first portion and the second portion are spaced apart from one another by a distance $d_1$, $d_1$, being less than $d_{fo}$. Thus, when the first mold portion and the second mold portion are in the closed mold position, molded articles can be made within the mold cavities. On the other hand, when the first portion and the second portion of the mold are in one of the open positions, each of the molded articles formed within the mold cavities can be retained on one of the mandrels.

The first carrying device comprises a first array of N article acceptors. Each of the article acceptors is sized and dimensioned to accept and retain a molded article from one of the mandrels. Each of the article acceptors within this first array has an open forward end and a rearward end. Each of the forward ends of the article acceptors within the first array is disposed within a first article acceptor plane.

The first carrying device is movable between (i) an extended first carrying device position wherein the first carrying device is disposed between the first portion and the second portion of the mold when the first portion and the second portion are in the fully open position and each of the first article acceptors is aligned with a mandrel within the second portion of the mold and (ii) a retracted first carrying device position wherein the first carrying device is not disposed between the first portion of the mold and the second portion of the mold.

Like the first carrying device, the second carrying device comprises a second array of N article acceptors. Each of the articles acceptors is sized and dimensioned to accept and retain a molded article from one of the mandrels. Each of the article acceptors within the second array has an open forward end and a rearward end. Each of the forward ends of the article acceptors within the second array is disposed in a second article acceptor plane.

The second carrying device is movable between (i) an extended second carrying device position wherein the second carrying device is disposed between the first portion of the mold and the second portion of the mold when the first portion and the second portion are in the fully open position and each of the second article acceptors is aligned with a mandrel within the second portion of the mold and (ii) a retracted second carrying device position wherein the second carrying device is not disposed between the first portion of the mold and the second portion of the mold.

Preferably, but optionally, each of the article acceptors is capable of being internally cooled, such as by the internal flowing of a cooling liquid.

DRAWINGS

These features, aspects and advantages of the present invention will become better understood with regard to the following description, appended claims and accompanying figures where:

FIG. 2 is a cross-sectional side view of an article acceptor useful in the invention;

FIG. 3 is a plan view of the article acceptor illustrated in FIG. 2;

FIG. 4 is a cross-sectional side view of the article acceptor illustrated in FIG. 2, the article acceptor being shown in the closed position with a molded article disposed therein;

FIG. 5 is a second cross-sectional side view of the article acceptor illustrated in FIG. 2, the article acceptor being shown empty and in the open position;

FIG. 7 is a schematic illustration of the basic operation of a carrying device having features of the invention; and FIGS. 8–25 illustrate 18 steps in a typical cycle of an injection mold apparatus having features of the invention.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

Figure 1:
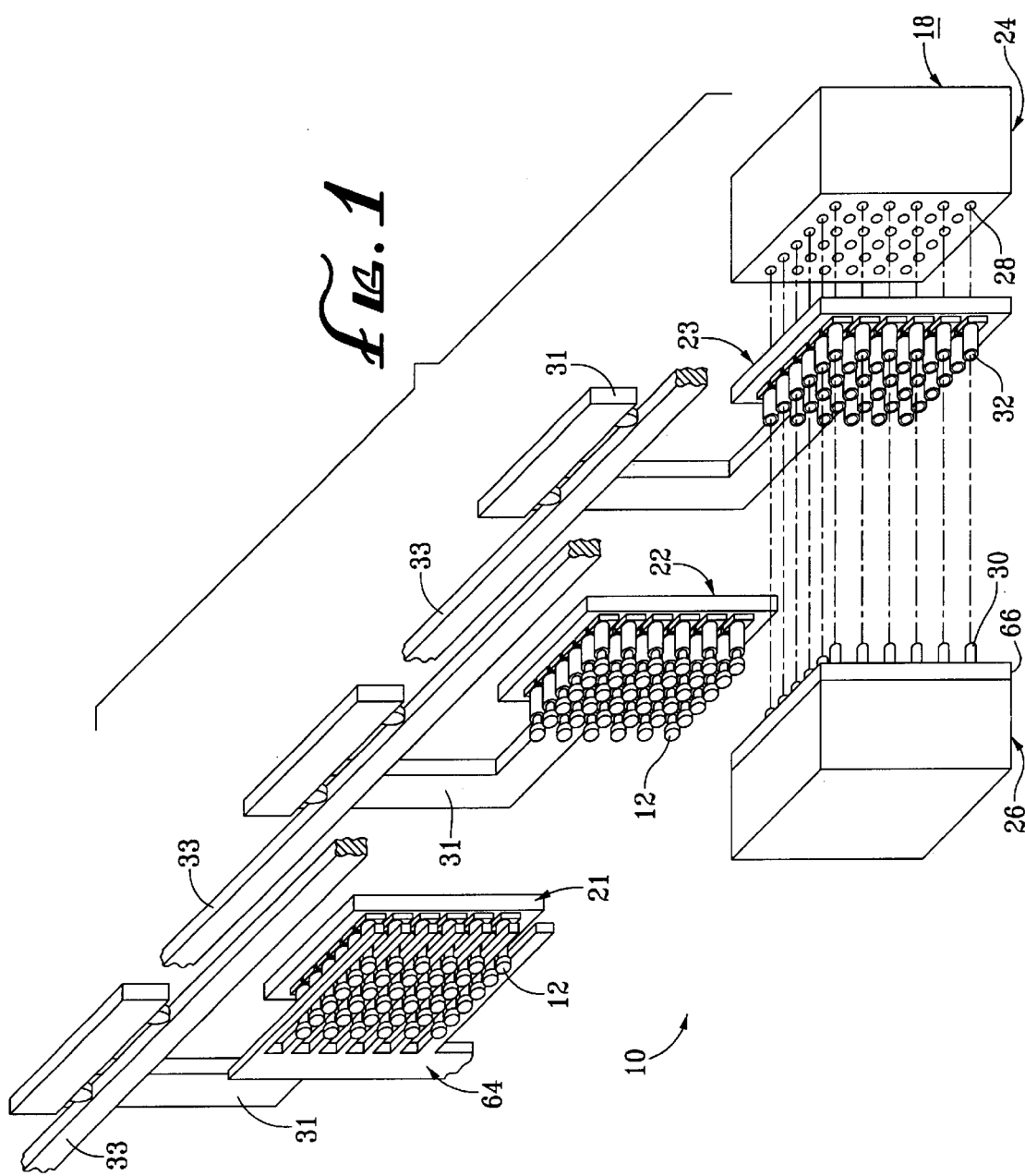
FIG. 1 is an isometric view of an apparatus having features of the invention.

As illustrated in FIG. 1, the invention is an apparatus 10 useful in the manufacture of molded articles 12. The molded articles 12 can be of any of a wide variety of molded articles capable of being manufactured in an injection mold. In the embodiment illustrated in the drawings, the molded articles 12 are plastic bottle pre-forms (as best seen in FIGS. 2 and 4) each having a base 13, an externally threaded mouth 14 and a circumferential mouth ridge 16.

The apparatus 10 comprises a mold 18 for making the molded articles 12, a first carrying device 21 for transferring molded articles 12 from the mold 18 and at least one additional (second) carrying device 22 for transferring molded articles 12 from the mold 18. In the embodiment illustrated in the drawings, the apparatus 10 also comprises a third carrying device 23 for transferring molded articles 12 from the mold 18.

The mold 18 comprises a first portion 24 and a second portion 26. The first portion 24 has a plurality of mold cavities 28 and the second portion 26 has a plurality of mandrels 30. In the embodiment illustrated in the drawings, the plurality of mold cavities 28 is an array of N mold cavities 28 and the plurality of mandrels 30 is an array of N mandrels 30. Each of the mandrels 30 is aligned with one of the mold cavities 28 such that each mandrel 30 can be disposed within a mold cavity 28.

Each of the mold cavities 28 defines the external topography of a molded article 12, and each of the mandrels 30 defines the internal topography of a molded article 12. Thus, when each mandrel 30 is disposed within a mold cavity 28, a molded article 12 can be molded within the mold cavity 28 such that the molded article 12 will have an external topography matching the internal topography of the mold cavity 28 and an internal topography matching the external topography of the mandrel 30.

The first portion 24 and the second portion 26 of the mold 18 are movable with respect to one another between (i) a closed position (indicated by the letter A in FIG. 8) wherein the first portion 24 and the second portion 26 are in abutment with one another and the mold cavities 28 are each enclosed, and (ii) a fully open position (indicated by the letter B in FIG. 7) wherein the first portion 24 and the second portion 26 are spaced apart from one another by a distance $d_{fo}$.

As illustrated in FIG. 7, to accommodate and cooperate with the first carrying device 21 and the second carrying device 22, the first portion 24 and the second portion 26 of the mold are also moveable to and from a first intermediate open position (indicated by the letter C in FIG. 7) wherein the first portion 24 and the second portion 26 are spaced apart from one another by a distance $d_1$, $d_1$, being less than $d_{fo}$. When the first mold portion 24 and the second portion 26 are in the closed mold position, molded articles can be made within the mold cavities 28. When the first portion 24 and the second portion 26 of the mold 18 are in the open position, each of the molded articles 12 formed within the mold cavities 28 can be retained on one of the mandrels 30.

In the embodiment illustrated in the drawings, the first carrying device 21, the second carrying device 22 and the third carrying device 23 are each supported by a movable support structure 31 which rolls along a fixed overhead horizontal rail 33.

The first carrying device 21 comprises a first array of N articles acceptors 32, each sized and dimensioned to accept and retain a molded article 12 from one of the mandrels 30. Each of the article acceptors 32 within the first array has a forward open end 34 and a rearward end 36. Each of the forward ends 34 of the article acceptors 32 within the first array are disposed in a first article acceptor plane 38.

The first carrying device 21 is moveable between (i) an extended first carrying device position wherein the first carrying device 21 is disposed between the first portion 24 of the mold 18 and the second portion 26 of the mold 18 when the first portion 24 and the second portion 26 are in the fully open position with each of the first article acceptors 32 aligned with a mandrel 30 within the second portion 26 of the mold 18, and (ii) a retracted first carrying device position wherein the first carrying device 21 is not disposed between the first portion 24 of the mold 18 and the second portion 26 of the mold 18. In the embodiment illustrated in the drawings, the first carrying device 21 is also moveable between the retracted first carrying device position and a discharge first carrying device position.

The second carrying device 22 for carrying molded articles 12 comprises a second array and an array of N articles 32, also sized and dimensioned to accept and retain a molded article 12 from one of the mandrels 30. Each of the article acceptors 32 within the second array has a forward open end 34 and a rearward end 36. Each of the forward ends 34 of the article acceptors 32 within the second array are disposed in a second article acceptor plane 40.

The second carrying device 22 is moveable between (i) an extended second carrying device position, wherein the second carrying device 22 is disposed between the first portion 24 and the second portion 26 of the mold 18 when the first portion 24 and the second portion 26 are in the fully opened position with each of the second article acceptors 32 aligned with a mandrel 30 within the second portion 26 of the mold 18 and (ii) a retracted second carrying device position wherein the second carrying device 22 is not disposed between the first portion 24 and the second portion 26 of the mold 18. The second carrying device 22 is also moveable between the retracted second carrying device position and a discharge second carrying device position.

The third carrying device 23 comprises a third array of N articles 32, also sized and dimensioned to accept and retain the molded article 12 from one of the mandrels 30. Each of the article acceptors 32 within the third array has a forward open end 34 and a rearward end 36. Each of the forward ends 34 of the article acceptors 32 within the third array are disposed in a third article acceptor plane 42.

The third carrying device 23 is moveable between (i) an extended third carrying device position wherein the third carrying device 23 is disposed between the first portion 24 of the mold 18 and the second portion 26 of the mold 18 when the first portion 24 and the second portion 26 are in the fully open position with each of the third article acceptors 32 aligned with a mandrel 30 within the second portion 26 of the mold 18 and (ii) a retracted third carrying device position wherein the third carrying device 23 is not disposed between the first portion 24 of the mold 18 and the second portion 26 of the mold 18. In the embodiment illustrated in the drawings, the third carrying device 23 is also moveable between the retracted third carrying device position and a discharge third carrying device position.

As illustrated in FIGS. 2–5, each article acceptor 32 further comprises a first longitudinal portion 44 and a second longitudinal portion 46. The first longitudinal portion 44 is pivotally attached to the second longitudinal portion 46 proximate to the rearward end 36 of the article acceptor 32. The first longitudinal portion 44 and the second longitudinal portion 46 are urged into abutment with one another at the forward end 34 of the article acceptor 32, such as by a resilient member 48. In the embodiment illustrated in the drawings, the resilient member 48 is a simple resilient band disposed around the forward end 34 of each article acceptor 32.

In the embodiment illustrated in the drawings, each article acceptor 32 further comprises an optional second resilient member 48 disposed around the base portion of each article acceptor 32.

Preferably, each of the longitudinal portions 44 and 46 of each article acceptor 32 comprises an internal passageway 50 for circulating a cooling liquid.

Also in the embodiment illustrated in the drawings, the first longitudinal portion 44 and the second longitudinal portion 46 are pivotally connected at a pivot pin 52. The forward sections 54 of the first longitudinal portion 44 and the second longitudinal portion 46 can be pivoted away from one another about the pivot pin 52 as illustrated in FIG. 5. The pivoting of the first longitudinal portion 44 and the second longitudinal portion 46 can be activated by a pair of opposed L-shaped plates 56 which can be moved up and down (with respect to the orientation illustrated in FIGS. 4 and 5). As the L-shaped plates 56 move down, they press upon shoulder elements 58 at the base 60 of each longitudinal portion 44 and 46. Pressing down on the shoulder elements 58 causes each longitudinal portion 44 and 46 to pivot about the pivot pin 52. As is illustrated in FIG. 5, when the forward sections 54 of the longitudinal portions 44 and 46 are pivoted away from each other, the opening 62 at the forward end 34 of the article acceptor 32 is expanded. This allows for the easy intake and discharge of a molded article 12 into and out of the article acceptor 32.

When the L-shaped plates 56 are not pressed down onto the shoulder elements 52 of the longitudinal portions 44 and 46, the resilient member 48 disposed near forward end 34 of each article acceptor 32 tends to hold the two longitudinal portions 44 and 46 in abutment with one another (as illustrated in FIG. 4).

Figure 6:
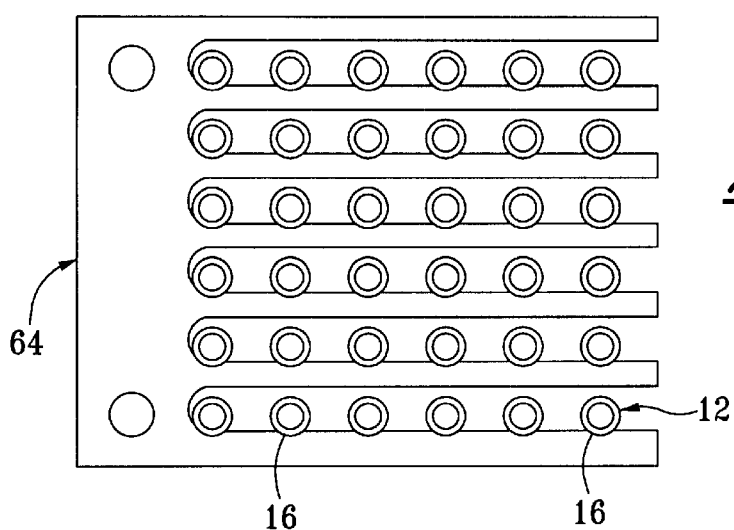
FIG. 6 is a detail drawing of an apparatus capable of ejecting finished articles from the article acceptors.

The apparatus 10 may further comprise means for removing molded articles 12 from the article acceptors 32. Such means can include equipment (not shown) capable of pushing the molded article 12 out of each article acceptor with a push rod which pushes upon the rear portion of the molded article 12 from the rearward end 36 of each article acceptor 32. In the embodiment illustrated in the drawings, however, such means are provided by a plurality of parallel fingers 64 which are sized and dimensioned to engage a portion of each molded article 12. As illustrated in FIG. 6, the parallel fingers 64 can be sized and dimensioned to engage the circumferential mouth ridge 16 of each of the molded articles 12.

In the embodiment illustrated in the drawings, the means for removing molded articles 12 comprises three sets of parallel fingers 64, each of the sets being disposed in parallel with one another. Each set of parallel fingers 64 is located such that it can cooperate with one of the three carrying devices 21, 22 or 23. Each of the sets of parallel fingers 64 are laterally moveable as illustrated in FIG. 7. When each set of parallel fingers 64 has engaged molded articles 12 disposed within one of the carrying devices 21, 22 or 23 (as illustrated in FIG. 6), such movement of the parallel fingers 64 disengages the molded articles 12 from the article acceptors 21, 22 or 23 (as illustrated in FIG. 7).

FIG. 7 illustrates the basic operation of the invention. On the right side of FIG. 7, the third carrying device 23 is shown disposed at the extended third carrying device position. Each of the article acceptors 32 within the third carrying device 23 is aligned with a mandrel 30 in the second portion 26 of the mold 18. Although not illustrated in FIG. 7, each of the L-shaped plates 56 in the third article acceptor 23 is pressed against the shoulder elements 58 of each of the article acceptors 32 so that each article acceptor 32 in the third carrying device 23 is disposed in an open position (such as illustrated in FIG. 5).

The second portion of the mold 26 comprises a moveable front plate 66 capable of movement independent of the remainder of the second portion 26 of the mold 18. Thus, as the front plate 66 of the second portion 26 of the mold 18 is thrust forward towards the third carrying device 23, molded articles 12 from each of the mandrels 30 are easily thrust fully into one of the article acceptors 32. When this is accomplished, the L-shaped plates 56 retract from the shoulder elements 52 of each article acceptor 32, thereby allowing the resilient member 48 on each article acceptor 32 to place the article acceptor into a substantially closed position. In this manner, each of the article acceptors "clamps down" with gentle but sufficient force to accept and retain each of the molded articles 12. Thereafter, as the front plate 66 of the second portion 26 of the mold 18 is retracted, each of the molded articles 12 remains within an article acceptor 32 in the third carrying device 23.

In FIG. 7, the second portion 26 of the mold 18 is shown in a second intermediate open position (indicated by the letter D). FIG. 7 also illustrates the first intermediate open position C (in phantom) and the fully open position B (also in phantom).

In the central portion of FIG. 7, the second carrying device 22 is shown in the retracted carrying device position. In operation, all of the molded articles 12 disposed within a carrying device 21, 22 or 23 disposed at the retracted carrying device position are cooled by cooling fluid circulating through each of the article acceptors 32. As the molded articles 12 cool they contract slightly. However, the force applied by each resilient member 48 maintains the cooled internal surfaces of each longitudinal portion 44 and 46 in contact with each molded article 12.

At the left side of FIG. 7, the first carrying device 21 is shown in the discharge position wherein the parallel fingers 64 have engaged the circumferential mouth ridge 16 of each of the molded articles 12 within the first carrying device 21. The L-shaped plates 26 have been activated to open each of the article acceptors 32 (as illustrated in FIG. 5) and the parallel fingers 64 have been moved away from the carrying device 21 so as to disengage each of the molded articles 12 from each of the article acceptors 32.

FIG. 7 illustrates in detail the relative positions of the several components of the invention 10. It must be understood, however, that in a typical operating sequence, the several components of the invention 10 would not necessarily be disposed as illustrated in FIG. 7. To understand a typical operating sequence, FIGS. 8–25 are provided.

Figure 8:
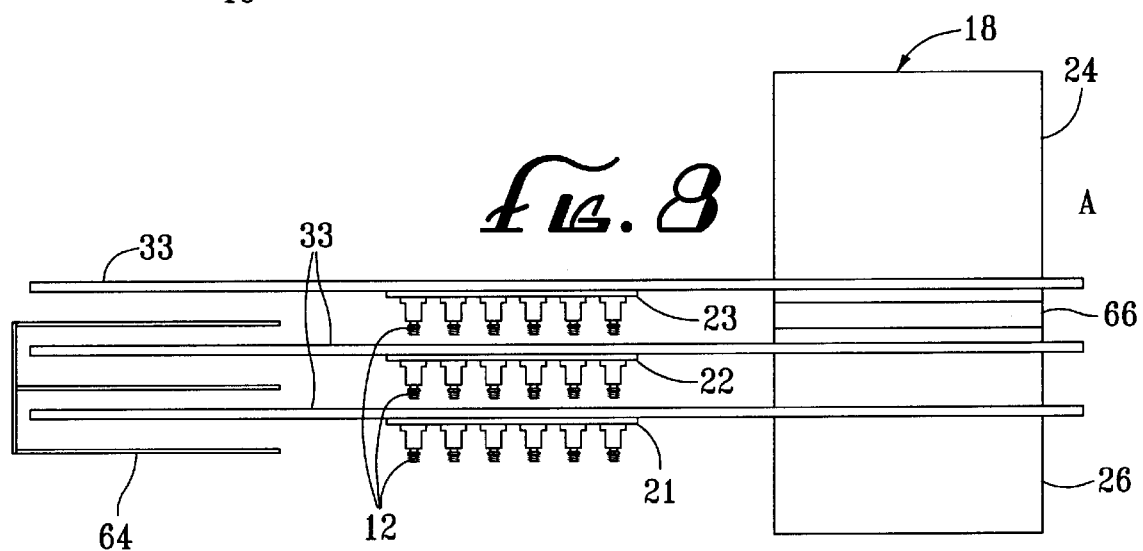

FIG. 8 illustrates the two mold portions 24 and 26 in the closed position while new molded articles 12 are being molded. Each of the three carrying devices 21, 22 and 23 is disposed within its respective retracted position. Each of the molded articles 12 within each carrying device 21, 22 and 23 is being cooled by coolant liquid flowing through each of the article acceptors 32. In FIG. 8, the molded articles 12 within the first carrying device 21 are the most cooled, molded articles 12 within the second carrying device 22 are the next most cooled and molded articles 12 within the third carrying device 23 are the least cooled.

Figure 9:
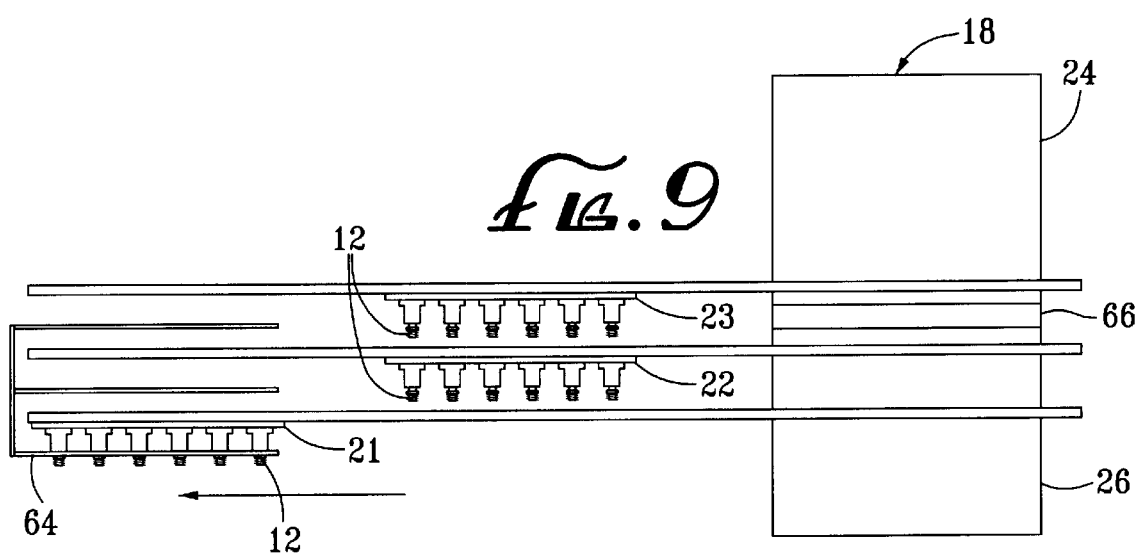
Figure 10:
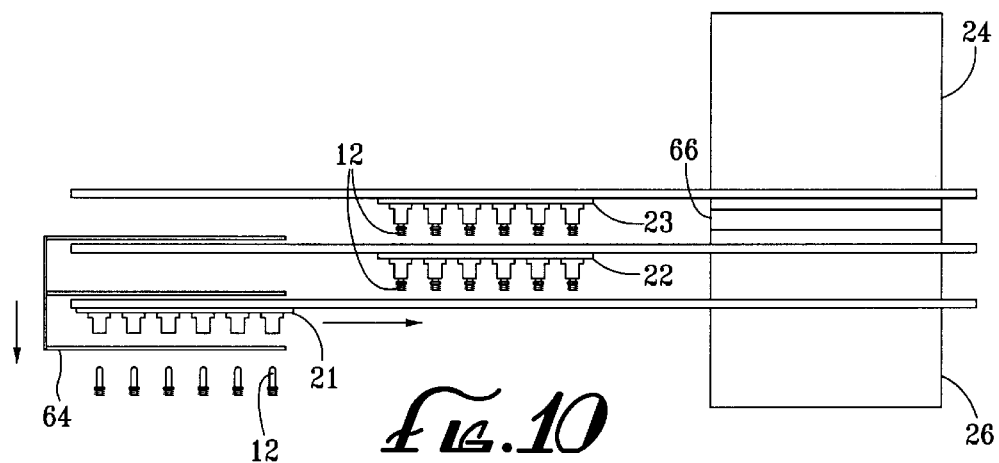

FIG. 9 illustrates the next step in the cycle. When the molded articles 12 within the first carrying device 21 are sufficiently cooled, the first carrying device 21 is moved to the discharge first carrying device position wherein the parallel fingers 64 engage each circumferential mouth ridge 16 of each of the molded articles 32 in the first carrying device 21. Next, as illustrated in FIG. 10, the parallel fingers 64 move laterally away from the first carrying device 21 so as to disengage molded articles 12 from each of the article acceptors 32 within the first carrying device 21.

Figure 11:
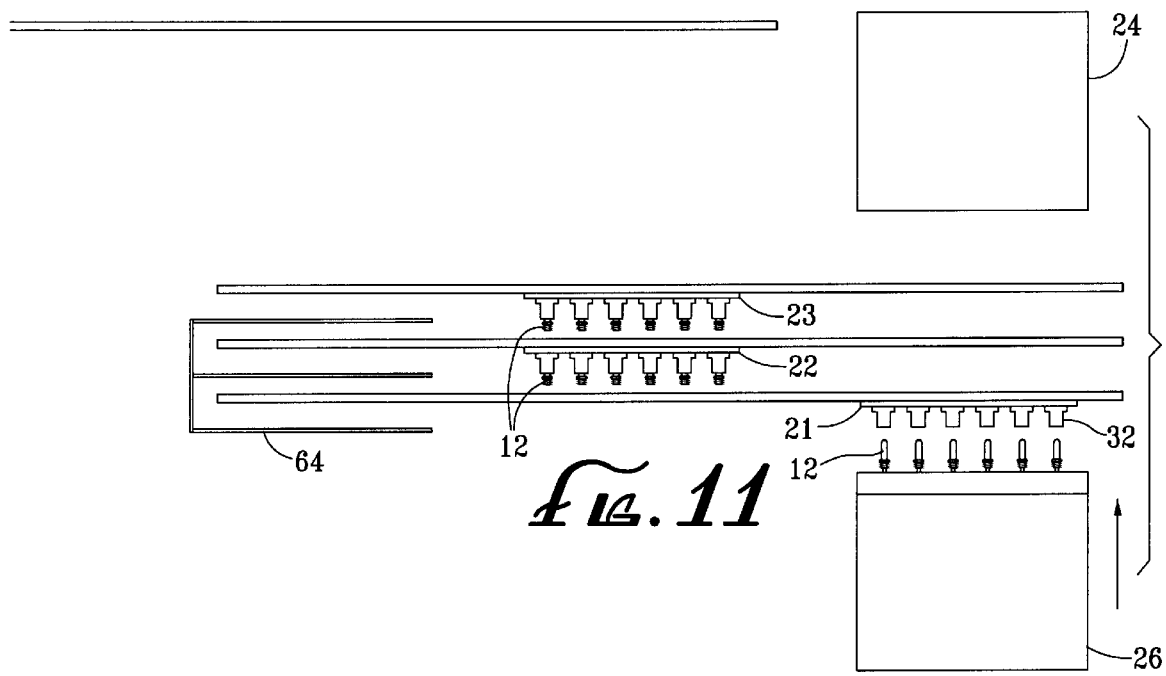

After the molded articles 12 are disengaged from the first carrying device 21, the first carrying device 21 moves laterally to a position directly adjacent to the mold 18. At this point, the two mold portions 24 and 26 move to the fully opened position. The now empty first carrying device 21 is then moved into the extended first carrying device position, as illustrated in FIG. 11, ready to accept new molded articles 12. In FIG. 11, the new molded articles 12 are shown attached to each of the mandrels 30 in the second portion 26 of the mold 18.

In FIG. 12, the front plate 66 of the second portion 26 of the mold 18 is thrust forward to place each of the newly formed molded articles 12 into article acceptors 32 within the first carrying device 21. In FIG. 13, the front plate 66 of the second portion 26 of the mold 18 is retracted and the first carrying device 21 is moved to the retracted first carrying device position.

Figure 16:
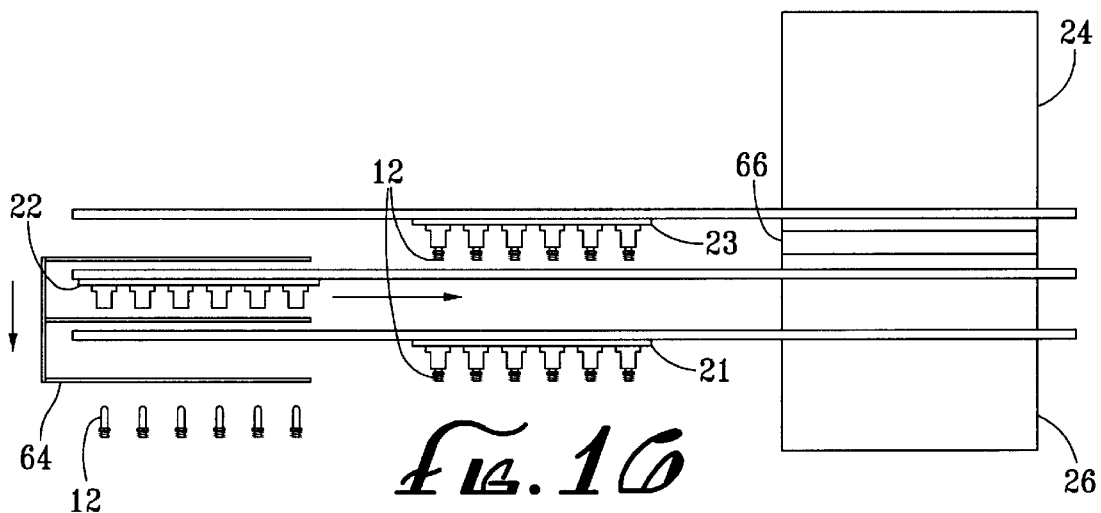

In FIG. 14, the two mold portions 24 and 26 are shown to move to the closed position to begin the molding of new molded articles 12. Next, as illustrated in FIG. 15, the second carrying device 22 is moved to the discharge second carrying device position wherein each of the molded articles 12 within the second carrying device 22 is engaged into a set of parallel fingers 64. FIG. 16 illustrates the use of the parallel fingers 64 to disengage molded articles 12 from the second carrying device 22.

Figure 17:
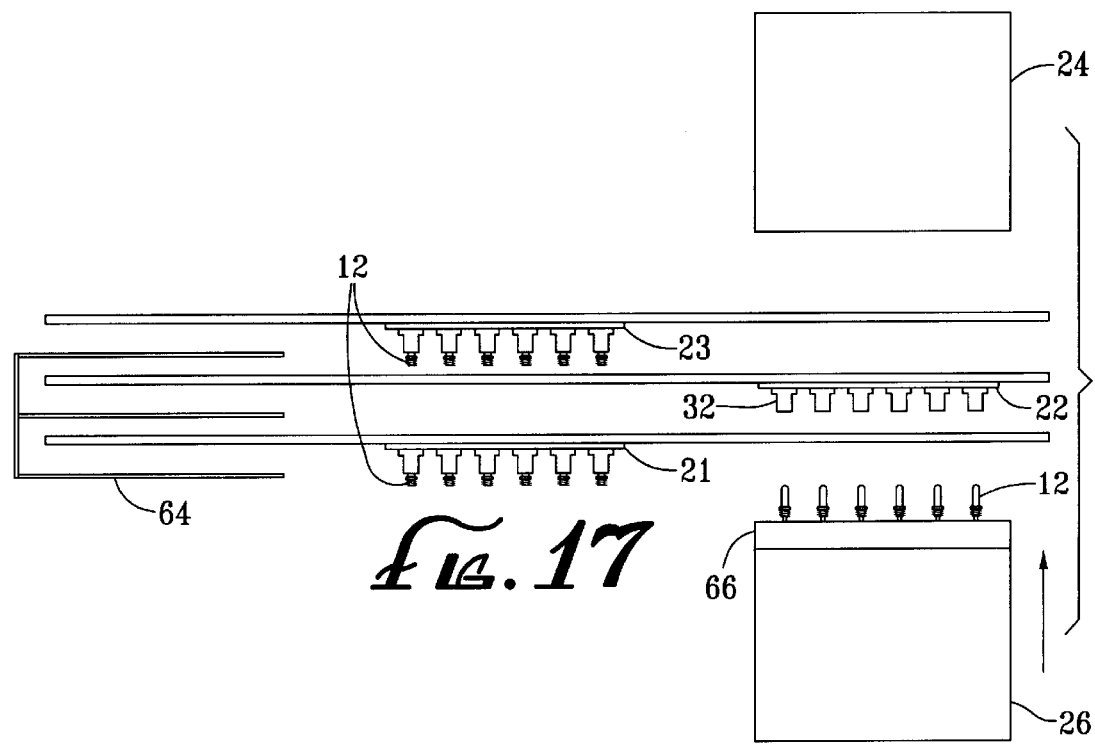

After the molded articles 12 are disengaged from the second carrying device 22, the second carrying device 22 moves laterally to a position directly adjacent to the mold 18. At this point, the two mold portions 24 and 26 move to the first intermediate open position. The now empty second carrying device 22 is then moved into the extended second carrying device position, as illustrated in FIG. 17, ready to accept new molded articles 12. In FIG. 17, the new molded articles 12 are shown attached to each of the mandrels 30 in the second portion 26 of the mold 18.

Figure 18:
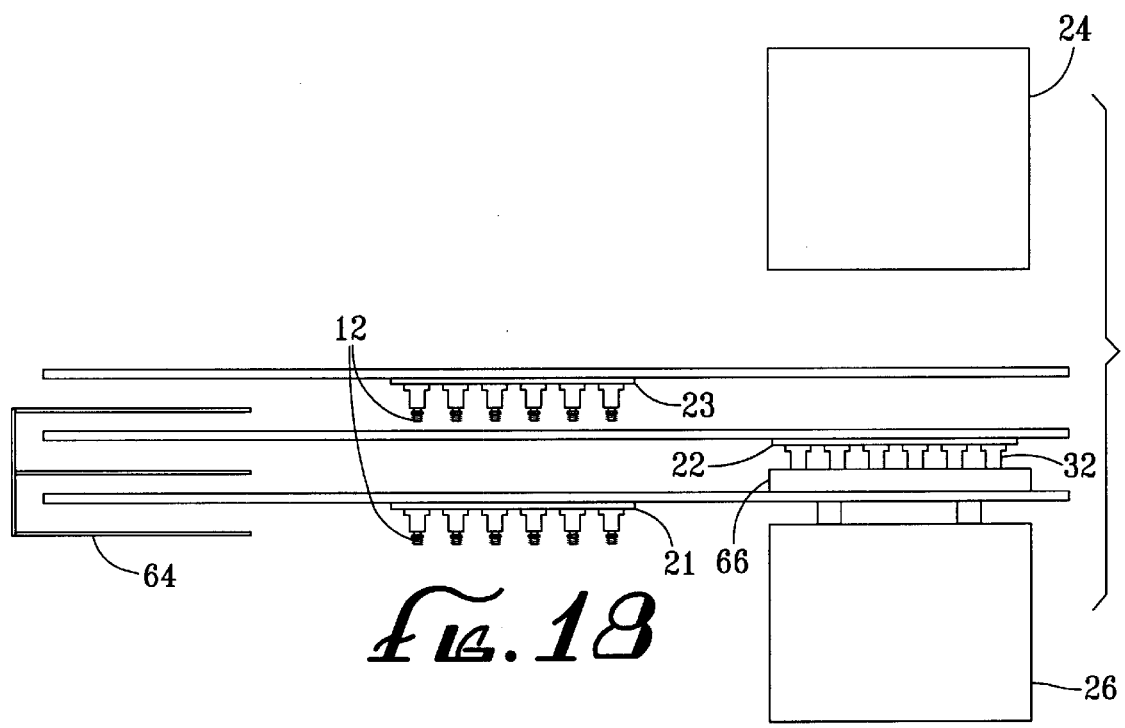

FIG. 18 illustrates how the front plate 66 of the second portion 26 of the mold 18 extends forward to deliver the newly formed molded articles 12 into the article acceptors 32 in the second carrying device 22.

Figure 19:
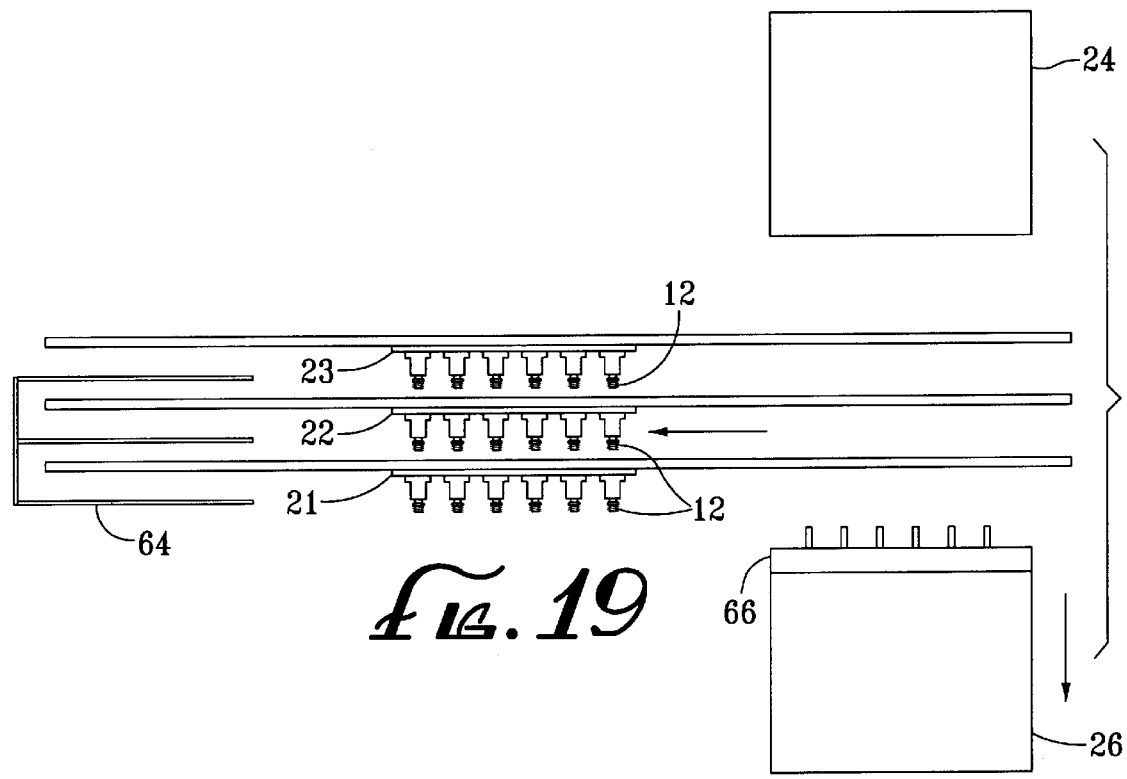

FIG. 19 illustrates the next step wherein the front plate 66 of the second portion 26 of the mold 18 is retracted and the second carrying device 22 is moved to the retracted second carrying device position. Thereafter, as illustrated in FIG. 20, the mold 18 again closes and new molded articles 12 are formed within the mold 18. During this time, finished molded articles 12 within the three carrying devices 21, 22 and 23 are being cooled.

Next, as illustrated in FIG. 21, molded articles 12 within the third carrying device 23 are moved to the discharge third carrying device position wherein each of the molded articles 12 is engaged by one of the sets of parallel fingers 64. The movement of the parallel fingers 64 discharges each of the molded articles 12 from the third carrying device 23, as illustrated in FIG. 22.

After the molded articles 12 are disengaged from the third carrying device 23, the third carrying device 23 moves laterally to a position directly adjacent to the mold 18. At this point, the two mold portions 24 and 26 move to the second intermediate open position. The now empty third carry device 23 is then moved into the extended third carrying device position, as illustrated in FIG. 23, ready to accept new molded articles 12. In FIG. 23, the new molded articles 12 are shown attached to each of the mandrels 30 in the second portion 26 of the mold 18.

Figure 24:
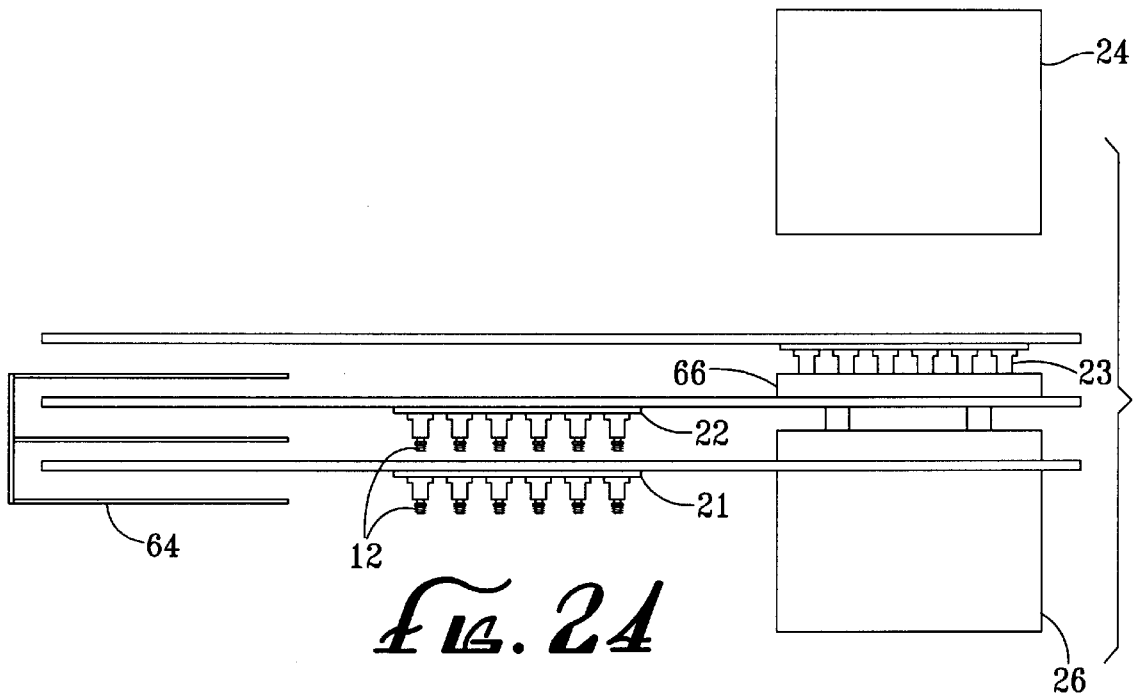

As illustrated in FIG. 24, the second mold portion 26 is moved to the second intermediate open position and the front plate 26 of the second portion 26 of the mold 18 is extended forward to deliver newly formed molded articles into the article acceptors 32 within the third carrying device 23.

Figure 25:
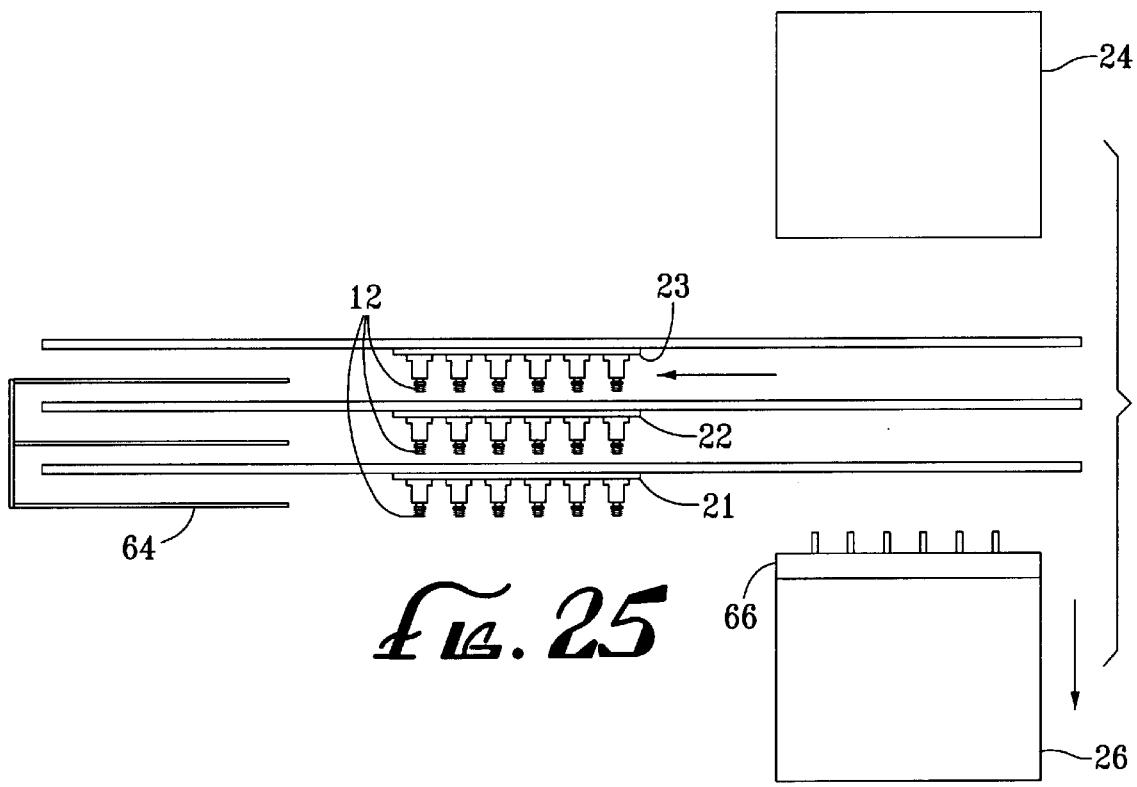

Finally, as illustrated in FIG. 25, the third carrying device 23 is moved to the retracted third carrying device position. From FIG. 25, the cycle is begun anew by returning to the configuration of the equipment as illustrated in FIG. 8. Thereafter, the cycle can be continuously repeated as illustrated in FIGS. 8–25, and then back again to FIG. 8.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. An apparatus useful in the manufacture of molded articles, the apparatus comprising:

(a) a mold for making the molded articles having a first portion and an opposed second portion, the first portion comprising an array of N mold cavities, the second portion comprising an array of N mandrels, each of the mandrels being aligned with one of the mold cavities, the first portion and the second portion being movable with respect to one another between (i) a closed position wherein the first portion and the second portion are in abutment with one another and the mold cavities are each enclosed, (ii) a fully open position wherein the first portion and the second portion are spaced apart from one another by a distance $d_{fo}$ and (iii) a first intermediate open positon wherein the first portion and the second portion are spaced apart from one another by a distance $d_1$, $d_1$ being less than $d_{fo}$, whereby, when the first mold portion and the second mold portion are in the closed mold position, molded articles can be made within the mold cavities, and, when the first portion and the second portion are in one of the open positions, each of the molded articles formed within the mold cavities can be retained on one of the mandrels;

(b) a first carrying device for transferring molded articles from the mold, the first carrying device comprising a first array of N article acceptors each sized and dimensioned to accept and retain a molded article from one of the mandrels, each of the article acceptors within the first array having an open forward end and a rearward end, each of the forward ends of the article acceptors within the first array being disposed in a first article acceptor plane, the first carrying device being movable between (i) an extended first carrying device position wherein the first carrying device is disposed between the first portion of the mold and the second portion of the mold when the first portion and the second portion are in the fully open position with each of the first article acceptors aligned with a mandrel within the second portion of the mold and (ii) a retracted first carrying device position wherein the first carrying device is not disposed between the first portion of the mold and the second portion of the mold; and (c) a second carrying device for transferring molded articles from the mold, the second carrying device comprising a second array of N article acceptors each sized and dimensioned to accept and retain a molded article from one of the mandrels, each of the article acceptors within the second array having an open forward end and a rearward end, each of the forward ends of the article acceptors within the second array being disposed in a second article acceptor plane, the second carrying device being movable between (i) an extended second carrying device position wherein the second carrying device is disposed between the first portion of the mold and the second portion of the mold when the first portion and the second portion are in the fully open position with each of the second article acceptors aligned with a mandrel within the second portion of the mold and (ii) a retracted second carrying device position wherein the second carrying device is not disposed between the first portion of the mold and the second portion of the mold;

wherein each article acceptor comprises a first longitudinal portion and a second longitudinal portion, the first longitudinal portion being pivotally attached to the second longitudinal portion proximate to the rearward end of the article acceptor.

2. The apparatus of claim 1 wherein the first portion of the mold and the second portion of the mold are movable with respect to one another between the closed position, the fully open position, the first intermediate open position, and a second intermediate open position wherein the first portion and the second portion are spaced apart from each other by a distance $d_2$, $d_2$ being less than $d_{fo}$ and $d_1$, and wherein the apparatus further comprises a third carrying device for transferring molded articles from the mold, the third carrying device comprising a third array of N article acceptors, each sized and dimensioned to accept and retain a molded article from one of the mandrels, each of the article acceptors within the third array having an open forward end and a rearward end, each of the forward ends of the article acceptors within the third array being disposed in a third article acceptor plane, the third carrying device being moveable between (i) an extended third carrying device position wherein the third carrying device is disposed between the first portion of the mold and the second portion of the mold when the first portion and the second portion are in the fully open position with each of the third article acceptors aligned with a mandrel within the second portion of the mold, and (ii) a retracted third carrying device position wherein the third carrying device is not disposed between the first portion of the mold and the second portion of the mold.

3. The apparatus of claim 1 wherein the first longitudinal portion and the second longitudinal portion of each article acceptor are urged into abutment with one another at the forward end of the article acceptor by a resilient member.

4. The apparatus of claim 3 wherein the resilient member is a resilient band disposed around each article acceptor.

5. The apparatus of claim 1 wherein each longitudinal portion of each article acceptor comprises a shoulder element disposed approximate to the rearward end of the article acceptor, and wherein the two longitudinal portions of each article acceptor can be urged away from one another at the forward end of each article acceptor by applying pressure to each of the shoulder elements.

6. The apparatus of claim 1 wherein at least one of the longitudinal portions of each article acceptor comprises an internal passageway for circulating a cooling liquid.

7. The apparatus of claim 1 further comprising first and second molded article removal devices for removing molded articles from each of the article acceptors, each molded article removal device comprising a plurality of parallel fingers sized and dimensioned to engage a portion of each molded article.

8. An apparatus useful in the manufacture of molded articles, the apparatus comprising:

(a) a mold for making the molded articles having a first portion and an opposed second portion, the first portion comprising an array of N mold cavities, the second portion comprising an array of N mandrels, each of the mandrels being aligned with one of the mold cavities, the first portion and the second portion being movable with respect to one another between (i) a closed position wherein the first portion and the second portion are in abutment with one another and the mold cavities are each enclosed, (ii) a fully open position wherein the first portion and the second portion are spaced apart from one another by a distance $d_{fo}$, (iii) a first intermediate open position wherein the first portion and the second portion are spaced apart from one another by a distance $d_1$, $d_1$ being less than $d_{fo}$, and (iv) a second intermediate open position wherein the first portion and the second portion are spaced apart from one another by a distance $d_2$, $d_2$ being less than both $d_{fo}$ and $d_1$, whereby, when the first mold portion and the second mold portion are in the closed mold position, molded articles can be made within the mold cavities, and, when the first portion and the second portion are in one of the open positions, wherein each of the molded articles formed within the mold cavities can be retained on one of the mandrels;

(b) a first carrying device for transferring molded articles from the mold, the first carrying device comprising a first array of N article acceptors each sized and dimensioned to accept and retain a molded article from one of the mandrels, each of the article acceptors within the first array having an open forward end and a rearward end, each of the forward ends of the article acceptors within the first array being disposed in a first article acceptor plane, the first carrying device being movable between (i) an extended first carrying device position wherein the first carrying device is disposed between the first portion of the mold and the second portion of the mold when the first portion and the second portion are in the fully open position with each of the first article acceptors aligned with a mandrel within the second portion of the mold, and (ii) a retracted first carrying device position wherein the first carrying device is not disposed between the first portion of the mold;

(c) a second carrying device for transferring molded articles from the mold, the second carrying device comprising a second array of N article acceptors each sized and dimensioned to accept and retain a molded article from one of the mandrels, each of the article acceptors within the second array having an open forward end and a rearward end, each of the forward ends of the article acceptors within the second array being disposed in a second article acceptor plane, the second carrying device being movable between (i) an extended second carrying device position wherein the second carrying device is disposed between the first portion of the mold and the second portion of the mold when the first portion and the second portion are in the fully open position a with each of the second article acceptors aligned with a mandrel within the second portion of the mold, and (ii) a retracted second carrying device position wherein the second carrying device is not disposed between the first portion of the mold and the second portion of the mold; and (d) a third carrying device for transferring molded articles, the third carrying device comprising a third array of N article acceptors, each sized and dimensioned to accept and retain a molded article from one of the mandrels, each of the article acceptors within the third array having an open forward end and a rearward end, each of the forward ends of the article acceptors within the third array being disposed in a third article acceptor plane, the third carrying device being moveable between (i) an extended third carrying device position wherein the third carrying device is disposed between the first portion of the mold and the second portion of the mold when the first portion and the second portion are in the fully open position with each of the third article acceptors aligned with a mandrel within the second portion of the mold, and (ii) a retracted third carrying device position wherein the third carrying device is not disposed between the first portion of the mold and the second portion of the mold;

wherein each article acceptor comprises a first longitudinal portion and a second longitudinal portion, the first longitudinal portion being pivotally attached to the second longitudinal portion proximate to the rearward end of the article acceptor.

9. The apparatus of claim 8 wherein the first longitudinal portion and the second longitudinal portion of each article acceptor are urged into abutment with one another at the forward end of the article acceptor by a resilient member.

10. The apparatus of claim 9 wherein the resilient member is a resilient band disposed around each article acceptor.

11. The apparatus of claim 8 wherein each longitudinal portion of each article acceptor comprises a shoulder element disposed approximate to the rearward end of the article acceptor, and wherein the two longitudinal portions of each article acceptor can be urged away from one another at the forward end of each article acceptor by applying pressure to each of the shoulder elements.

12. The apparatus of claim 8 wherein at least one of the longitudinal portions of each article acceptor comprises an internal passageway for circulating a cooling liquid.

13. The apparatus of claim 8 further comprising first and second molded article removal devices for removing molded articles from each of the article acceptors, each molded article removal device comprising a plurality of parallel fingers sized and dimensioned to engage a portion of each molded articles.

14. An apparatus useful in the manufacture of molded articles, the apparatus comprising:

(a) a mold for making the molded articles having a first portion and an opposed second portion, the first portion comprising an array of N mold cavities, the second portion comprising an array of N mandrels, each of the mandrels being aligned with one of the mold cavities, the first portion and the second portion being movable with respect to one another between (i) a closed position wherein the first portion and the second portion are in abutment with one another and the mold cavities are each enclosed, (ii) a fully open position wherein the first portion and the second portion are spaced apart from one another by a distance $d_{fo}$ and, (iii) a first intermediate open position wherein the first portion and the second portion are spaced apart from one another by a distance $d_1$, $d_1$ being less than $d_{fo}$, whereby, when the first mold portion and the second mold portion are in the closed mold position, molded articles can be made within the mold cavities, and, when the first portion and the second portion are in one of the open positions, each of the molded articles formed within the mold cavities can be retained on one of the mandrels;

(b) a first carrying device for transferring molded articles from the mold, the first carrying device comprising a first array of N article acceptors each sized and dimensioned to accept and retain a molded article from one of the mandrels, each of the article acceptors within the first array having an open forward end and a rearward end, each of the forward ends of the article acceptors within the first array being disposed in a first article acceptor plane, the first carrying device being movable between (i) an extended first carrying device position wherein the first carrying device is disposed between the first portion of the mold and the second portion of the mold when the first portion and the second portion are in the fully open position with each of the first article acceptors aligned with a mandrel within the second portion of the mold and (ii) a retracted first carrying device position wherein the first carrying device is not disposed between the first portion of the mold and the second portion of the mold; and (c) a second carrying device for transferring molded articles from the mold, the second carrying device comprising a second array of N article acceptors each sized and dimensioned to accept and retain a molded article from one of the mandrels, each of the article acceptors within the second array having an open forward end and a rearward end, each of the forward ends of the article acceptors within the second array being disposed in a second article acceptor plane, the second carrying device being movable between (i) an extended second carrying device position wherein the second carrying device is disposed between the first portion of the mold and the second portion of the mold when the first portion and the second portion are in the fully open position with each of the second article acceptors aligned with a mandrel within the second portion of the mold and (ii) a retracted second carrying device position wherein the second carrying device is not disposed between the first portion of the mold and the second portion of the mold;

wherein each article acceptor comprises a first longitudinal portion and a second longitudinal portion, the first longitudinal portion being pivotally attached to the second longitudinal portion proximate to the rearward end of the carrying device; and wherein at least one of the longitudinal portions of each article acceptor comprises an internal passageway for circulating a cooling liquid.

15. The apparatus of claim 14 wherein each longitudinal portion of each article acceptor comprises a shoulder element disposed approximate to the rearward end of the article acceptor, and wherein the two longitudinal portions of each article acceptor can be urged away from one another at the forward end of each article acceptor by applying pressure to each of the shoulder elements.

16. The apparatus of claim 14 wherein both longitudinal portions of each article acceptor comprises an internal passageway for circulating a cooling liquid.

17. The apparatus of claim 14 wherein the first longitudinal portion and the second longitudinal portion of each article acceptor are urged into abutment with one another at the forward end of the article acceptor by a resilient member.

18. The apparatus of claim 17 wherein the resilient member is a resilient band disposed around each article acceptor.

* * * * *